Nov. 4, 1930.                J. H. PIXLEY                1,780,840
         GRASS PULLING ATTACHMENT FOR SPRING TOOTHED HARROWS
                    Filed Oct. 4, 1928        2 Sheets-Sheet 1
Fig. 1.
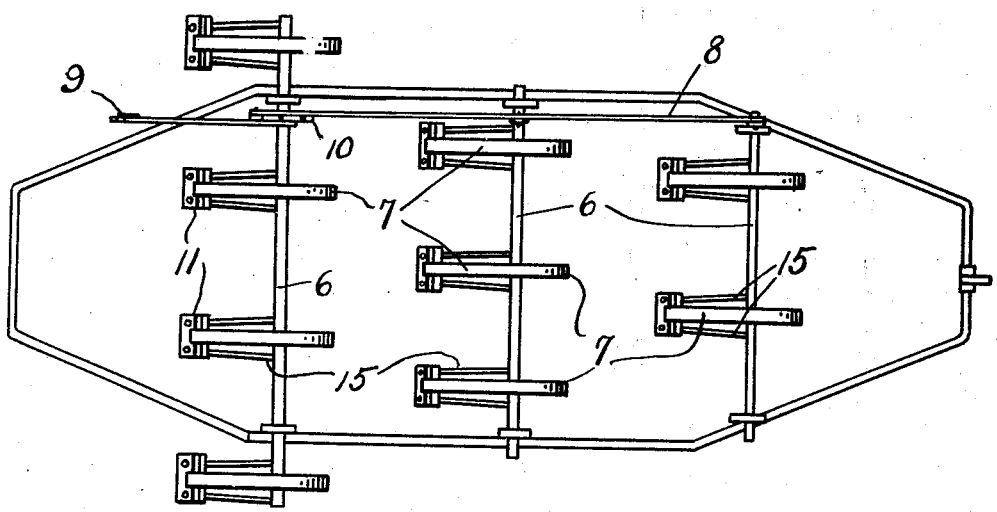
Fig. 2.
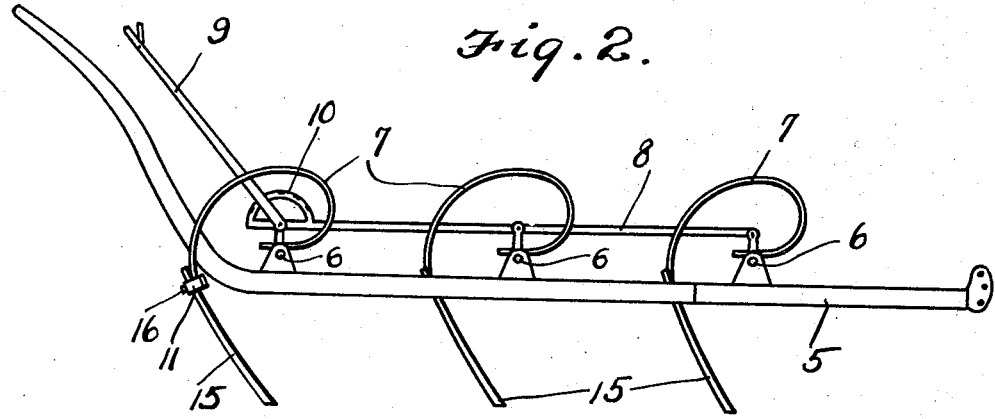
Fig. 3.
Inventor
John H. Pixley
By Clarence A. O'Brien
                Attorney Nov. 4, 1930. J. H. PIXLEY 1,780,840
GRASS PULLING ATTACHMENT FOR SPRING TOOTHED HARROWS
Filed Oct. 4, 1928 2 Sheets-Sheet 2
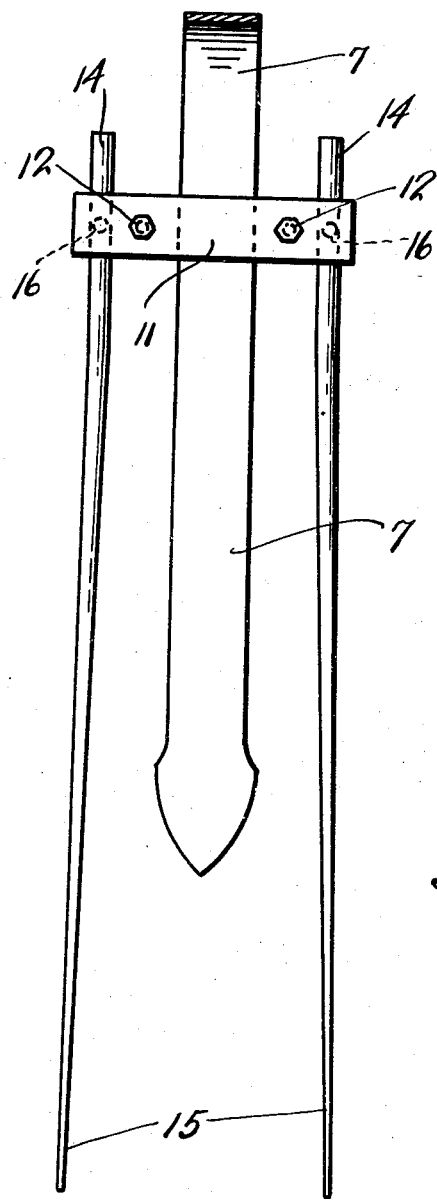
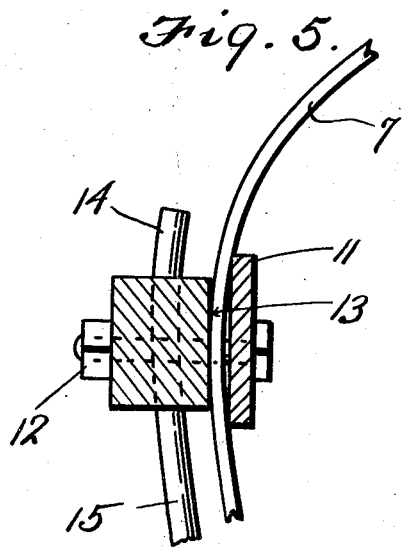
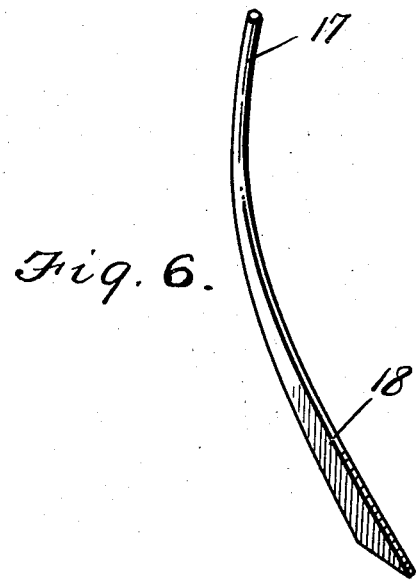
Inventor
John H. Pixley
By Clarence A. O'Brien
Attorney Patented Nov. 4, 1930

1,780,840

UNITED STATES PATENT OFFICE

JOHN H. PIXLEY, OF HARRISON, MICHIGAN

GRASS-PULLING ATTACHMENT FOR SPRING-TOOTHED HARROWS

Application filed October 4, 1928. Serial No. 310,328.

The present invention relates to attachments for harrow teeth and is designed particularly for use in pulling grass during the operation of the harrow.

One of the important objects of the invention is to provide an attachment of this character by means of which a grass pulling tooth may be mounted in parallel relation with the tooth at each side thereof and by means of which grass, weeds, or the like having roots penetrating the ground below the depth of the harrow tooth may be engaged and removed.

Another object of the invention is to provide means for adjustably securing the attachment in position upon the harrow tooth.

A still further object is to provide an attachment of this character which may be readily removed from the tooth when desiring to use the harrow in the usual manner.

Other objects and advantages reside in the special construction, combination and arrangement of the various elements forming the invention as more fully hereinafter described and claimed, reference being had to the accompanying drawings forming part thereof wherein like numerals indicate like parts, in which:

Figure 1 is a top plan view of a harrow showing the teeth thereof provided with the attachment constituting the present invention.

Figure 2 is a side elevational view.

Figure 3 is a transverse sectional view through one of the teeth and illustrating the relative position of the attachment with respect thereto.

Figure 4 is a view in elevation thereof.

Figure 5 is a fragmentary sectional view taken substantially upon the line 5—5 of Figure 3, and Figure 6 is a detail of one of the grass pulling teeth forming a part of the invention.

Referring now to the drawings in detail, wherein for the purpose of illustration I have disclosed a preferred embodiment of my invention, the numeral 5 indicates a harrow frame having a plurality of transversely extending spaced parallel shafts 6 journaled thereon and to which shafts are attached a series of spring harrow teeth 7. The teeth 7 are arranged on the various shafts in staggered relation as illustrated in Figure 1 of the drawing. The shafts 6 are connected for uniform movement by a link 8 having one end operatively connected with an operating lever 9 cooperating with a quadrant 10 for securing the teeth in adjusted position. The subject matter of the present invention comprises an attachment for each of the teeth 7 and includes a pair of attaching plates 11 disposed at opposite faces of the tooth and secured thereto by bolts 12. One of the plates has its inner face recessed as shown at 13 within which the tooth is seated so that the other of said plates operates as a clamp for securing the tooth in position therein. The recessed plate is also provided with vertically extending openings adjacent the opposite ends thereof within which the shank 14 of a grass pulling tooth 15 is inserted. The tooth is secured in vertically adjusted position to the plate by a set screw 16. The tooth 15 is preferably constructed with its upper or shank portion rounded as illustrated at 17 in Figure 6 of the drawing and with its lower end curved forwardly and flattened at its opposite sides as illustrated at 18. It will be apparent from the foregoing that one of the teeth 15 will be positioned at each side of the blade 7, and the attaching plates 11 are secured to the blade so that the lower ends of the teeth 15 will extend below the lower end of the harrow tooth. The teeth 15 consequently will penetrate the soil to a greater depth than the blades 7 and will thus be able to engage the roots of grass and weeds for removing the same from the soil. Suitable adjustment for the teeth 15 may be made either by means of the set screw 16 or by means of the bolts 12 provided for securing the plates on the harrow blades.

It is obvious that my invention is susceptible to various changes and modifications in construction without departing from the spirit of the invention or the scope of the appended claims, and I accordingly claim all such forms of the device to which I am entitled.

Having thus described the invention, what

I claim as new and desire to secure by Letters Patent is:—

1. A grass pulling attachment for harrow teeth comprising a pair of attaching plates disposed at the opposite faces of the harrow tooth, means carried by the plates for securing the same in position thereon, and a pair of grass pulling teeth adjustably secured to said attaching plates at opposite sides of the harrow tooth.

2. A grass pulling attachment for harrow teeth comprising a pair of attaching plates disposed at opposite faces of the tooth and disposed transversely with respect thereto in a horizontal plane, one of said plates having a recess formed therein for receiving said tooth, bolts carried by the plates for securing the same in vertically adjusted position on the tooth, one of said plates having vertically disposed openings formed adjacent the opposite ends thereof and a grass pulling tooth having its upper end inserted through one of the openings and with its lower end extending below the end of the harrow tooth and a set screw arranged for adjustably securing the grass pulling tooth in position on said plate.

3. A grass pulling attachment for harrow teeth comprising a pair of attaching plates disposed at opposite faces of the tooth and disposed transversely with respect thereto in a horizontal plane, one of said plates having a recess formed therein for receiving said tooth, bolts carried by the plates for securing the same in vertically adjusted position on the tooth, one of said plates having vertically disposed openings formed adjacent the opposite ends thereof and a grass pulling tooth having its upper end inserted through one of the openings and with its lower end extending below the end of the harrow tooth and a set screw arranged for adjustably securing the grass pulling tooth in position on said plate, said grass pulling tooth having its opposite sides flattened at the lower end thereof.

In testimony whereof I affix my signature.

JOHN H. PIXLEY.